US008668320B2

(12) United States Patent
Fujioka et al.

(10) Patent No.: US 8,668,320 B2
(45) Date of Patent: Mar. 11, 2014

(54) TREATMENT LIQUID FOR INK JET RECORDING

(75) Inventors: Masaya Fujioka, Nagoya (JP); Noriaki Satoh, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 400 days.

(21) Appl. No.: 13/014,376

(22) Filed: Jan. 26, 2011

(65) Prior Publication Data

US 2011/0187788 A1 Aug. 4, 2011

(30) Foreign Application Priority Data

Jan. 29, 2010 (JP) .................................. 2010-019751

(51) Int. Cl.
*B41J 2/01* (2006.01)
(52) U.S. Cl.
USPC .................. 347/100; 347/95; 347/96; 347/97
(58) Field of Classification Search
USPC ............ 347/21, 28, 92, 93, 95–100; 523/160, 523/161; 106/31.13, 31.27, 31.6
See application file for complete search history.

(56) References Cited

U.S. PATENT DOCUMENTS

| 5,609,671 | A | 3/1997 | Nagasawa |
| 5,837,045 | A | 11/1998 | Johnson et al. |
| 7,284,806 | B2 * | 10/2007 | Nakamura ........................ 347/6 |
| 7,527,367 | B2 * | 5/2009 | Morita ............................. 347/86 |
| 2001/0030678 | A1 | 10/2001 | Katsuragi et al. |
| 2002/0044185 | A1 | 4/2002 | Koitabashi et al. |
| 2003/0189672 | A1 * | 10/2003 | Ueki ............................... 348/655 |
| 2004/0183874 | A1 * | 9/2004 | Toyoda et al. .................. 347/86 |
| 2006/0023042 | A1 | 2/2006 | Doi |
| 2006/0125895 | A1 | 6/2006 | Nito et al. |
| 2006/0201380 | A1 | 9/2006 | Kowalski et al. |
| 2007/0100023 | A1 | 5/2007 | Burns et al. |
| 2007/0100024 | A1 | 5/2007 | Gu et al. |
| 2008/0174643 | A1 | 7/2008 | Notoya et al. |
| 2008/0241398 | A1 | 10/2008 | Kato et al. |
| 2009/0234067 | A1 | 9/2009 | Kariya |
| 2009/0258203 | A1 | 10/2009 | Aoyama et al. |
| 2011/0074871 | A1 * | 3/2011 | Uchiyama ....................... 347/28 |

FOREIGN PATENT DOCUMENTS

| EP | 0 534 634 A1 | 9/1992 |
| EP | 05-034634 | 3/1993 |
| EP | 1077239 A1 | 2/2001 |
| EP | 1400364 A1 | 3/2004 |
| JP | 06-062906 | 1/1993 |
| JP | 06-070202 | 3/1993 |
| JP | 05-202328 | 8/1993 |
| JP | 05-202328 A | 8/1993 |

(Continued)

OTHER PUBLICATIONS

JP Notification of Reasons for Rejection dated Oct. 14, 2011, corresponding Application No. 2010-019751; English Translation (partial).

(Continued)

*Primary Examiner* — Matthew Luu
*Assistant Examiner* — Rut Patel
(74) *Attorney, Agent, or Firm* — Banner & Witcoff, Ltd.

(57) ABSTRACT

A treatment liquid for ink jet recording, containing a polyvalent metal ion and water. A dissolved carbon dioxide concentration in the treatment liquid is 4 mg/l or lower.

15 Claims, 3 Drawing Sheets

(56) References Cited

FOREIGN PATENT DOCUMENTS

| | | |
|---|---|---|
| JP | 08-003498 | 1/1996 |
| JP | 2000-513396 | 10/2000 |
| JP | 2001-301309 | 10/2001 |
| JP | 2002-079740 | 3/2002 |
| JP | 2002-121442 | 4/2002 |
| JP | 2003-165933 | 6/2003 |
| JP | 2008-524400 | 7/2008 |
| JP | 2008-246821 | 10/2008 |
| JP | 2009-515007 | 4/2009 |
| JP | 2009-262549 A | 11/2009 |

OTHER PUBLICATIONS

EP Extended Search Report dtd Apr. 26, 2011, EP Appln. 11250087.1.

* cited by examiner

(A) Example 1

(B) Example 2

(C) Example 3

(D) Example 4

(E) Example 5

(F) Example 6

(G) Example 7

(H) Example 8

(I) Comparative Example 1

(J) Comparative Example 2

(K) Comparative Example 3

FIG. 3

FIG. 4

# TREATMENT LIQUID FOR INK JET RECORDING

CROSS-REFERENCE TO RELATED APPLICATION

This application claims priority from Japanese Patent Application No. 2010-019751 filed on Jan. 29, 2010. The entire subject matter of the Japanese Patent Application is incorporated herein by reference.

BACKGROUND

A variety of treatment liquids for ink jet recording, containing polyvalent metal ions such as calcium ions are proposed. An image quality can be improved by causing the treatment liquid to contain a certain amount of polyvalent metal ion, and for example, bringing the treatment liquid into contact with a water-based ink on a recording medium by ejecting the treatment liquid prior to an ejection of the water-based ink.

However, the inventors of the present invention found out that there is a case that heating the treatment liquid in an ink-jet head adopting a thermal ink-jet technique (hereinafter referred to as a "thermal ink-jet head") causes nozzle clogging.

SUMMARY

A treatment liquid for ink jet recoding comprises: a polyvalent metal ion; and water. A dissolved carbon dioxide concentration in the treatment liquid is 4 mg/l or lower.

A method for producing a treatment liquid comprising a polyvalent metal ion and water comprises: a step of adjusting a dissolved carbon dioxide concentration in the treatment liquid to 4 mg/l or lower by performing at least one of a heat treatment and a deaeration treatment.

A water-based ink set for ink jet recording comprises: a water-based ink for ink jet recording; and a treatment liquid. The water-based ink comprises: a coloring agent; water; and a water-soluble organic solvent.

An ink-jet recording method is an ink-jet recording method for performing recording using the water-based ink set for ink jet recording with a thermal ink-jet technique.

The ink-jet recording method comprises: a step of ejecting the treatment liquid and the water-based ink on a recording medium with a thermal ink-jet technique.

An ink-jet recording apparatus comprises: an ink set storing portion; and a thermal ink-jet head. The water-based ink set for ink jet recording is stored in the ink set storing portion. A treatment liquid and a water-based ink that compose the water-based ink set are ejected on a recording medium from the thermal ink-jet head.

A method for preventing nozzle clogging is a method for preventing nozzle clogging caused by a treatment liquid in a thermal ink-jet technique. As the treatment liquid, a treatment liquid comprising a polyvalent metal ion and water is used. A dissolved carbon dioxide concentration in the treatment liquid is adjusted to 4 mg/l or lower.

DETAILED DESCRIPTION

As mentioned above, the treatment liquid contains a polyvalent metal ion and water. The treatment liquid may further contain other components besides the polyvalent metal ion and water.

The polyvalent metal ion has a function to causing a pigment in a water-based ink to aggregate or a dye in the same to deposit when the treatment liquid and the water-based ink contact to each other on a recording medium. Examples of the polyvalent metal ion include a calcium ion, a copper (II) ion, a nickel ion, a magnesium ion, a zinc ion, a barium ion, an aluminum ion, an iron (III) ion, a chromium ion, a cobalt ion, and an iron (II) ion. Out of these, the polyvalent metal ion may be a calcium ion. A method for adding the polyvalent metal ion to the treatment liquid is not particularly limited, and the polyvalent metal ion may be added as, for example, a salt composed of the polyvalent metal ion and an anion binding thereto. The anion is not particularly limited, and examples thereof include a bromide ion, a chloride ion, an iodide ion, a nitrate ion, an acetate ion, a lactate ion, a chlorate ion, and a sulfate ion. The amount of the polyvalent metal ion to be added with respect to the total amount of the treatment liquid is, for example, in the range of 0.1 wt % to 20 wt %, 0.3 wt % to 15 wt %, and 0.3 wt % to 10 wt %.

The water may be ion-exchange water or purified water. The amount of water to be added with respect to the total amount of the treatment liquid may be a balance of the other components, for example.

The dissolved carbon dioxide concentration in the treatment liquid is, as mentioned above, 4 mg/l or lower. Adjusting the dissolved carbon dioxide concentration to 4 mg/l or lower enables improvement in image quality without causing nozzle clogging. The lower the dissolved carbon dioxide concentration, the better. The lower limit thereof is not particularly limited, and is, for example 0 (detection limit).

The treatment liquid may further contain a water-soluble organic solvent. As the water-soluble organic solvent, a conventionally known water-soluble organic solvent may be used. Examples of the water-soluble organic solvent include polyvalent alcohol, a derivative thereof, alcohol, amide, ketone, keto alcohol, ether, a nitrogen-containing solvent, a sulfur-containing solvent, propylene carbonate, ethylene carbonate, and 1,3-dimethyl-2-imidazolidinone. Examples of the polyvalent alcohol include glycerin, ethylene glycol, diethylene glycol, propylene glycol, butylene glycol, hexylene glycol, triethylene glycol, polyethylene glycol, dipropylene glycol, tripropylene glycol, polypropylene glycol, trimethylolpropane, 1,5-pentanediol, and 1,2,6-hexanetriol. Examples of the derivative of the polyvalent alcohol include ethylene glycol methyl ether, ethylene glycol ethyl ether, ethylene glycol-n-propyl ether, ethylene glycol-n-butyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. Examples of the alcohol include methyl alcohol, ethyl alcohol, n-propyl alcohol, isopropyl alcohol, n-butyl alcohol, sec-butyl alcohol, isobutyl alcohol, tert-butyl alcohol, and benzyl alcohol. Examples of the amide include dimethylformamide and dimethylacetamide. The ketone may be, for example, acetone. The keto alcohol may be, for example, diacetone alcohol. Examples of the ether include tetrahydrofuran and dioxane. Examples of the nitrogen-containing solvent include pyrrolidone, 2-pyrrolidone, N-methyl-2-pyrrolidone, cyclohexyl pyrrolidone, and triethanolamine Examples of the sulfur-containing solvent include thiodiethanol, thiodiglycol, thiodiglycerol, sulfolane, and dimethyl sulfoxide. The amount of the water-soluble organic solvent to be added with respect to the total amount of the treatment liquid is not particularly limited. These water-soluble organic solvents may be used alone or in a combination of two or more of them.

The treatment liquid may or may not contain a coloring agent. In the case where the treatment liquid contains a coloring agent, the amount of the coloring agent may be an amount by which a recorded image is not influenced.

The treatment liquid may further contain a conventionally known additive as required. Examples of the additive include a surfactant, a pH adjuster, a viscosity modifier, a surface tension modifier, an antioxidant, and a mildew proofing agent. Examples of the viscosity modifier include polyvinyl alcohol, cellulose, and a water-soluble resin.

The treatment liquid may be produced by a method for producing a treatment liquid described below, but the treatment liquid producing method is not limited to this.

The pH of the treatment liquid is, for example, 7.4 or lower, in the range of 3.5 to 6.8, and 3.5 to 5.7. A method for adjusting the pH of the treatment liquid is not particularly limited, and may be any method such as a method in which an acidic aqueous solution is added to the treatment liquid. A weak acid aqueous solution such as an acetic acid aqueous solution may be used as the acidic aqueous solution to cause the treatment liquid to have a buffering function and to stabilize the pH after the adjustment.

The treatment liquid is, for example, used in the thermal ink-jet technique. In the thermal ink-jet technique, a treatment liquid and a water-based ink are ejected from a nozzle of an ink-jet head by foam pressure generated by heating the treatment liquid and the water-based ink. The treatment liquid absorbs carbon dioxide in the atmosphere, and thus it contains carbon dioxide unless otherwise being subjected to a specific treatment. It is considered that in the case where this treatment liquid contains a calcium ion, some of the carbon dioxide becomes water-soluble calcium hydrogen carbonate, and the water-soluble calcium hydrogen carbonate is dissolved in the treatment liquid. When this treatment liquid is heated in the thermal ink-jet head, the calcium hydrogen carbonate causes a decarboxylation reaction, and insoluble calcium carbonate is generated. Thus, there is a risk that the calcium carbonate may cause nozzle clogging in the thermal ink-jet head. In contrast, the generation of calcium carbonate is suppressed in the treatment liquid with a dissolved carbon dioxide concentration of 4 mg/l or lower. Thus, there is no risk to cause nozzle clogging. Note here the mechanism is merely a presumption, and do not limit the present invention.

Next, the method for producing a treatment liquid is explained. As mentioned above, the method for producing a treatment liquid is a method for producing a treatment liquid comprising a polyvalent metal ion and water. The treatment liquid producing method comprises a step of adjusting a dissolved carbon dioxide concentration in the treatment liquid to 4 mg/l or lower by performing at least one of a heat treatment and a deaeration treatment. The treatment liquid producing method is, for example, as follows. Note here that the treatment liquid producing method is not limited by the following example.

First, polyvalent metal ion solution is prepared by uniformly mixing a polyvalent metal ion, water, and other components to be added as required by a conventionally know method, and then removing precipitates with a filter.

Next, a dissolved carbon dioxide concentration in the polyvalent metal ion solution is adjusted to 4 mg/l or lower by performing at least one of a heat treatment and a deaeration treatment. In the method for producing a treatment liquid, both the heat treatment and the deaeration treatment may be performed. In the case where both the heat treatment and the deareration treatment are performed, the performing order is not particularly limited. They may be performed at the time, or one of them may be performed on ahead. The deaeration treatment may be performed after the heat treatment.

The temperature in the heat treatment is, for example, in the range of 40° C. to 90° C., 50° C. to 90° C., and 60° C. to 85° C. The time of the heat treatment is, for example, in the range of 1 minute to 120 minutes, 5 minutes to 90 minutes, and 10 minutes to 60 minutes.

The deaeration treatment may be performed by any method such as a method in which the polyvalent metal ion solution is stood still under the negative pressure environment. The negative pressure is, for example, in the range of −0.01 MPa to −0.1 MPa (the negative pressure is −0.01 MPa to −0.1 MPa lower than atmospheric pressure), −0.05 MPa to −0.1 MPa, and −0.07 MPa to −0.1 MPa. The time to stand still under the negative pressure environment is, for example, in the range of 0.1 hours to 48 hours, 0.5 hours to 36 hours, and 1 hour to 30 hours.

The water-based ink for ink jet recording (hereinafter also merely referred to as a "water-based ink" or a "ink") used together with the treatment liquid is not particularly limited, and a water-based ink in the following description of the water-based ink set for ink jet recording may be used.

Next, the water-based ink set for ink jet recording (hereinafter also merely referred to as a "water-based ink set" or an "ink set") is described. The water-based ink set contains a water-based ink for ink jet recording and the treatment liquid. The water-based ink contains a coloring agent, water, and a water-soluble organic solvent.

The coloring agent used in the water-based ink is not particularly limited, and may be a pigment or a dye. The coloring agent may contain a pigment. As the coloring agent, a mixture of a pigment and a dye may be used.

As the pigment, carbon black, an inorganic pigment, or an organic pigment may be used. Examples of the carbon black include furnace black, lamp black, acetylene black, and channel black. Examples of the inorganic pigment include inorganic pigments of titanium oxide, iron oxide, and carbon black. Examples of the organic pigment include: azo pigments such as azo lake, an insoluble azo pigment, a condensed azo pigment, and a chelate azo pigment; polycyclic pigments such as a phthalocyanine pigment, a perylene pigment, a perinone pigment, an anthraquinone pigment, a quinacridone pigment, a dioxazine pigment, a thioindigo pigment, an isoindolinone pigment, and a quinophthalone pigment; a dye lake pigment such as a basic dye lake pigment and an acidic dye lake pigment; a nitro pigment; a nitroso pigment; and an aniline black daylight fluorescent pigment.

Other pigments may be used when they can be dispersed in an aqueous phase. Examples of these pigments include: C.I. Pigment Black 1, 6, and 7; C.I. Pigment Yellow 1, 2, 3, 12, 13, 14, 15, 16, 17, 55, 78, 150, 151, 154, 180, 185, and 194; C.I. Pigment Orange 31 and 43; C.I. Pigment Red 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C.I. Pigment Violet 196; C.I. Pigment Blue 1, 2, 3, 15, 15:1, 15:2, 15:3, 15:4, 16, 22, and 60; and C.I. Pigment Green 7 and 36.

The pigment may be a self-dispersing pigment. The self-dispersing pigment is, for example, one can disperse in water without using a dispersant by introducing directly or via other groups, at least one of hydrophilic functional groups such as a carboxyl group, a carbonyl group, a hydroxyl group, a sulfo group, and a phosphate group and salts thereof to pigment particles through a chemical bond.

As the self-dispersing pigment, one obtained by treating a pigment by a method described in, for example, JP 8-3498 A, JP 2000-513396 A, JP 2008-524400 A, or JP 2009-515007 A may be used. As a raw material of the self-dispersing pigment, any of an inorganic pigment and an organic pigment may be used. The pigment that is suitable to be subjected to the treatment may be, for example, carbon black such as "MA8" or "MA100" manufactured by Mitsubishi Chemical Corporation or "Color Black FW200" manufactured by Evonik Degussa GmbH. As the self-dispersing pigment, a commercially available product may be used. Examples of the commercially available product include: "CAB-O-JET® 200", "CAB-O-JET® 250C", "CAB-O-JET® 260M", "CAB-O-JET® 270Y", "CAB-O-JET® 300", "CAB-O-JET® 400", "CAB-O-JET® 450C", "CAB-O-JET® 465M", and CAB-O-JET® 470Y", manufactured by Cabot Specialty Chemicals Inc.; "BONJET® BLACK CW-2" and "BONJET® BLACK CW-3", manufactured by Orient Chemical Industries Co., Ltd; and "LIOJET® WD BLACK 002C", manufactured by TOYO INK MFG CO., LTD.

The amount of solid content of the pigment to be added (the amount of solid content of the pigment) with respect to the total amount of the water-based ink is not particularly limited, and may be decided suitably depending on a desired optical density, coloration, and the like. The amount of solid content of the pigment is, for example, in the range of 0.1 wt % to 20 wt %, and 0.5 wt % to 10 wt %.

The dye is not particularly limited, and examples thereof include a direct dye, an acidic dye, a basic dye, and a reactive dye. Examples of the dye include C. I. Direct Black, C. I. Direct Blue, C. I. Direct Red, C. I. Direct Yellow, C. I. Direct Orange, C. I. Direct Violet, C. I. Direct Brown, C. I. Direct Green, C. I. Acid Black, C. I. Acid Blue, C. I. Acid Red, C. I. Acid Yellow, C. I. Acid Orange, C. I. Acid Violet, C. I. Basic Black, C. I. Basic Blue, C. I. Basic Red, C. I. Basic Violet, and C. I. Food Black. Examples of the C. I. Direct Black include C. I. Direct Black 17, 19, 32, 51, 71, 108, 146, 154, and 168. Example of the C. I. Direct Blue include C. I. Direct Blue 6, 22, 25, 71, 86, 90, 106, and 199. Examples of the C. I. Direct Red include C. I. Direct Red 1, 4, 17, 28, 83, and 227. Examples of the C. I. Direct Yellow include C. I. Direct Yellow 12, 24, 26, 86, 98, 132, 142, and 173. Examples of the C. I. Direct Orange include C. I. Direct Orange 34, 39, 44, 46, and 60. Examples of the C. I. Direct Violet include C. I. Direct Violet 47 and 48. The C. I. Direct Brown may be, for example, C. I. Direct Brown 109. The C. I. Direct Green may be, for example, C. I. Direct Green 59. Examples of the C. I. Acid Black include C. I. Acid Black 2, 7, 24, 26, 31, 52, 63, 112, and 118. Examples of the C. I. Acid Blue include C. I. Acid Blue 9, 22, 40, 59, 93, 102, 104, 117, 120, 167, 229, and 234. Examples of the C. I. Acid Red include C. I. Acid Red 1, 6, 32, 37, 51, 52, 80, 85, 87, 92, 94, 115, 180, 256, 289, 315, and 317. Examples of the C. I. Acid Yellow include C. I. Acid Yellow 11, 17, 23, 25, 29, 42, 61, and 71. Examples of the C. I. Acid Orange include C. I. Acid Orange 7 and 19. The C. I. Acid Violet may be, for example, C. I. Acid Violet 49. The C. I. Basic Black may be, for example, C. I. Basic Black 2. Examples of the C. I. Basic Blue include C. I. Basic Blue 1, 3, 5, 7, 9, 24, 25, 26, 28, and 29. Examples of the C. I. Basic Red include C. I. Basic Red 1, 2, 9, 12, 13, 14, and 37. Examples of the C. I. Basic Violet include C. I. Basic Violet 7, 14, and 27. Examples of the C. I. Food Black include C. I. Food Black 1 and 2.

The amount of the dye to be added with respect to the total amount of the water-based ink is not particularly limited, and is, for example, in the range of 0.1 wt % to 20 wt % and 0.3 wt % to 10 wt %.

These coloring agents may be used alone or in a combination of two or more of them.

The water used in the water-based ink may be ion-exchange water or purified water. The amount of the water to be added with respect to the total amount of the water-based ink (the proportion of the water in the water-based ink) is, for example, in the range of 10 wt % to 90 wt %, and 40 wt % to 80 wt %. The proportion of the water in the water-based ink may be a balance of the other components, for example.

Examples of the water-soluble organic solvent used in the water-based ink include: a humectant that prevents a water-based ink from drying at a nozzle tip portion of an ink-jet head; and a penetrant that adjusts a drying rate of a water-based ink on a recording medium.

The humectant is not particularly limited, and examples thereof include lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketone such as acetone; ketoalcohol such as diacetone alcohol; ethers such as tetrahydrofuran and dioxane; polyalcohols such as polyalkylene glycol, alkylene glycol, and glycerin; 2-pyrrolidone; N-methyl-2-pyrrolidone; and 1,3-dimethyl-2-imidazolidinone. Examples of the polyalkylene glycol include polyethylene glycol and polypropylene glycol. Examples of the alkylene glycol include ethylene glycol, propylene glycol, butylene glycol, diethylene glycol, triethylene glycol, dipropylene glycol, tripropylene glycol, thiodiglycol, and hexylene glycol. These humectants may be used alone or in a combination of two or more of them. Out of these, the humectant may be polyalcohol such as alkylene glycol or glycerin.

The amount of the humectant to be added with respect to the total amount of the water-based ink is, for example, in the range of 0 wt % to 95 wt %, 5 wt % to 80 wt %, and 5 wt % to 50 wt %.

Examples of the penetrant include glycol ethers. Examples of the glycol ethers include ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. The penetrants may be used alone or in a combination of two or more of them.

The amount of the penetrant to be added with respect to the total amount of the water-based ink is, for example, in the range of 0 wt % to 20 wt %, 0.1 wt % to 15 wt %, and 0.5 wt % to 10 wt %.

The water-based ink may further contain a conventionally known additive as required. Examples of the additive include a surfactant, a pH adjuster, a viscosity modifier, a surface tension modifier, and a mildew proofing agent. Examples of the viscosity modifier include polyvinyl alcohol, cellulose, and a water-soluble resin.

The water-based ink may be prepared by uniformly mixing a coloring agent, water, a water-soluble organic solvent, and other components to be added as required by a conventionally known method, and then removing precipitates with a filter, for example.

The water-based ink set for ink jet recording may be provided as an ink cartridge. For example, the ink cartridge includes an ink storing portion and a treatment liquid storing portion, the water-based ink is stored in the ink storing portion, and the treatment liquid is stored in the treatment liquid storing portion.

The ink cartridge may be an ink cartridge assembly obtained by assembling a water-based ink cartridge and a treatment liquid cartridge which are formed individually, or may be an integrated ink cartridge in which the inside is partitioned so that an ink storing portion and a treatment liquid storing portion are formed. As the body of the ink cartridge, a conventionally know body may be used, for example.

Next, an ink-jet recording method and an ink-jet recording apparatus, using the treatment liquid and the water-based ink are explained. The ink-jet recording method may be performed using, for example, the ink-jet recording apparatus. The recording includes recording of letters; images; printing; and the like.

Figure 1:
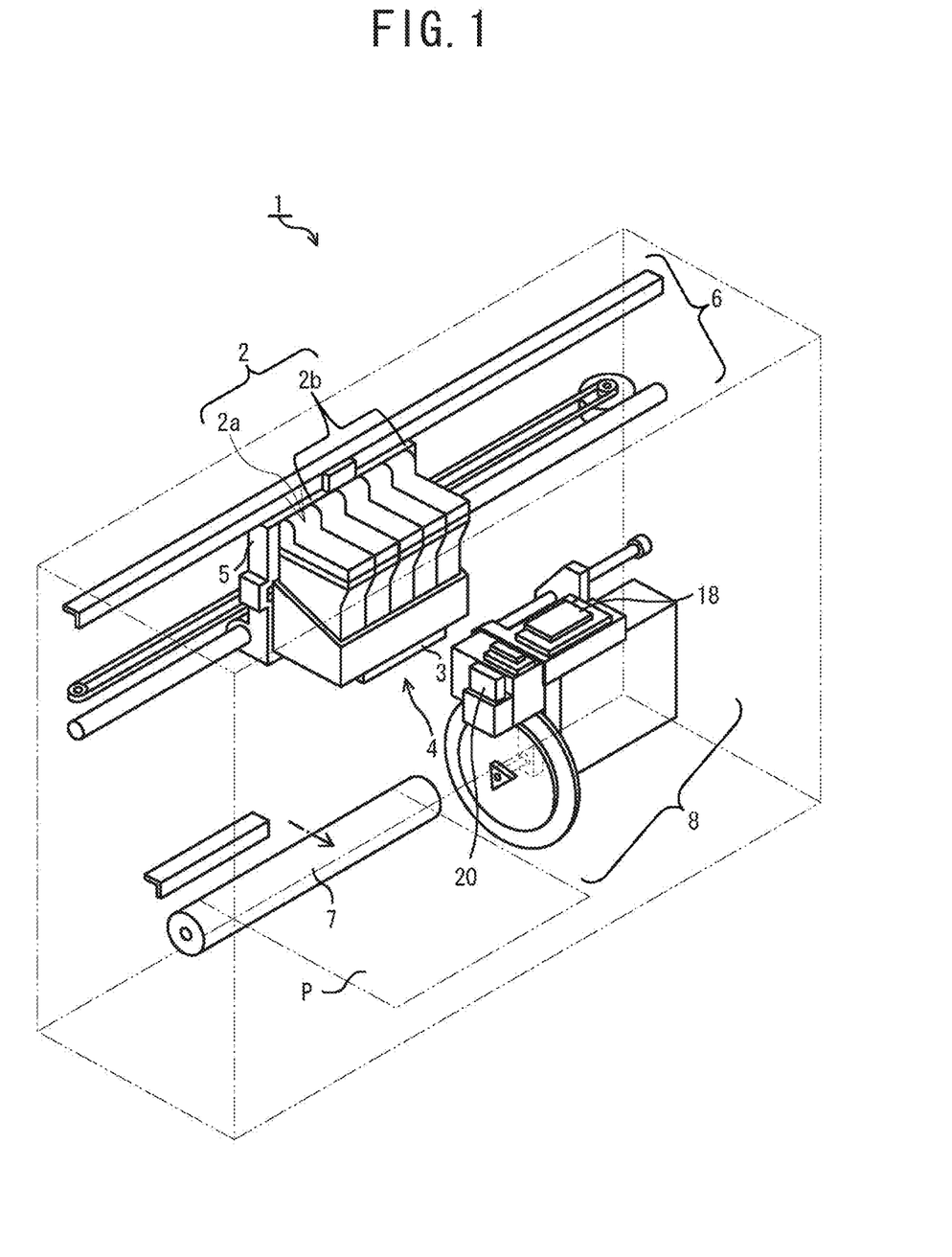
FIG. 1 is a schematic perspective view showing a configuration of an example of the ink-jet recording apparatus.

As shown in FIG. 1, an ink-jet recording apparatus 1 includes, as main components, an ink cartridge assembly 2, a thermal ink-jet head 3, a head unit 4, a carriage 5, a drive unit 6, a platen roller 7, and a purge unit 8, for example. The ink cartridge assembly 2 includes a treatment liquid cartridge 2a and four water-based ink cartridges 2b.

The treatment liquid cartridge 2a contains the treatment liquid. The four water-based ink cartridges 2b contain water-based inks of four colors, namely, yellow, magenta, cyan, and black, respectively.

The thermal ink-jet head 3 arranged in the head unit 4 performs recording on a recording medium (for example, a recording paper) P. The ink cartridge assembly 2 and the head unit 4 are mounted on the carriage 5. The drive unit 6 reciprocates the carriage 5 in a straight line. As the drive unit 6, a conventionally known drive unit may be used (see JP 2008-246821 A, for example). The platen roller 7 extends in the reciprocating direction of the carriage 5 and is arranged so as to face to the thermal ink-jet head 3.

The purge unit 8 draws poor inks containing, for example, air bubbles trapped inside the thermal ink-jet head 3. As the purge unit 8, a conventionally known purge unit may be used (see JP 2008-246821 A, for example).

On the platen roller 7 side of the purge unit 8, a wiper member 20 is provided adjacent to the purge unit 8. The wiper member 20 has a spatula shape, and wipes a nozzle-formed surface of the thermal ink-jet head 3 accompanying the movement of the carriage 5. In FIG. 1, a cap 18 covers a plurality of nozzles of the thermal ink-jet head 3, which returns to the reset position after completion of the recording, in order to prevent the inks from drying.

In the ink-jet recording apparatus 1 of this example, the ink cartridge assembly 2 is mounted on one carriage 5 together with the head unit 4. In the ink-jet recording apparatus, the respective cartridges of the ink cartridge assembly 2 may be mounted on a carriage that is different from that on which the head unit 4 is mounted. Alternatively, the respective cartridges of the ink cartridge assembly 2 may not be mounted on the carriage 5, but may be arranged and fixed in the ink jet recording apparatus. In such embodiment, for example, the respective ink cartridges of the ink cartridge assembly 2 are connected to the head unit 4 mounted on the carriage 5 via a tube or the like, and the treatment liquid and water-based inks are supplied to the head unit 4 from the respective cartridges of the ink cartridge assembly 2.

Ink jet recording using this ink-jet recording apparatus 1 is performed as follows, for example. First, the treatment liquid is ejected on the recording paper P from a nozzle in the thermal ink-jet head 3 by foam pressure generated by heating the treatment liquid. Even when the treatment liquid is heated in the thermal ink-jet head, since generation of an insoluble matter (solid content) is suppressed, there is no risk to cause nozzle clogging.

Then, the water-based ink is ejected on the part of the recording paper P, on which the treatment liquid has been adhered from the nozzle in the thermal ink-jet head 3 by foam pressure generated by heating the water-based ink. The time from the ejection of the treatment liquid to the ejection of the water-based ink is not particularly limited. For example, the ejection of the water-based ink may be performed in the same operation as that of the ejection of the treatment liquid. An image quality is improved by the contact between the treatment liquid and the water-based ink on the recording paper P.

As in this example, the water-based ink may be ejected on the recording paper P after the ejection of the treatment liquid on the same. According to this, coagulation efficiency of pigment in the water-based ink or deposition efficiency of dye in the same may be enhanced. The order of ejecting the treatment liquid and the water-based ink is not limited, and the treatment liquid may be ejected on the recording paper P after the ejection of the water-based ink on the same, or the treatment liquid and the water-based ink may be ejected on the recording paper P at the same time.

The recorded recording paper P then is discharged from the ink-jet recording apparatus 1. In FIG. 1, a feeding mechanism and a discharging mechanism of the recording medium P are not shown.

In the apparatus shown in FIG. 1, a serial-type ink jet head is employed, but the ink-jet recording apparatus may be an apparatus in which a line-type ink jet head is employed.

EXAMPLES

Next, the examples are explained together with the comparative examples. It is to be noted that the present invention is not limited by the following examples and comparative examples.

Examples 1 to 8 and Comparative Examples 1 to 6

The components shown in each treatment liquid composition (Tables 2 and 3) were mixed uniformly so as to obtain a mixture. With respect to each of Examples 1 to 4 and 6 to 8 and Comparative Examples 5 and 6, a pH of the mixture was adjusted suitably using a nitric acid aqueous solution or an acetic acid aqueous solution, and the total amount of the mixture and water was adjusted to be 100 wt %. With respect to each of Example 5 and Comparative Example 2, the mixture was heated at 80° C., was then stood for 30 minutes, and was thereafter stood for one day (24 hours) under a negative pressure environment at −0.09 MPa. Thus, each of treatment liquids of Examples 1 to 8 and Comparative Examples 1 to 6 was obtained.

With respect to the treatment liquids of the examples and the comparative examples, (a) measurement of pH, (b) measurement of dissolved carbon dioxide concentration, (c) evaluation of ejection stability, and (d) evaluation of image quality were conducted by the following methods.

(a) pH Measurement

A pH of the treatment liquid was measured using a compact pH meter (B-212) manufactured by HORIBA, Ltd.

(b) Dissolved Carbon Dioxide Concentration Measurement

A dissolved carbon dioxide concentration in a treatment liquid was measured using one obtained by attaching carbon dioxide electrodes (CE-2041) to a multi-function water quality meter (MM-60R), manufactured by DKK-TOA CORPORATION.

(c) Ejection Stability Evaluation

Each of the treatment liquids was continuously ejected using an ink-jet recording apparatus on which a thermal ink-jet head is mounted for 24 hours under the atmosphere at each of 5° C., room temperature, and 40° C. Then each of ejection stability evaluations was conducted according to the following evaluation criteria. Nonejection means the state in which the treatment liquid is not ejected because a nozzle in the thermal ink-jet head is clogged. A curved discharge means the state in which the treatment liquid is not ejected perpendicularly to a recording paper, and is ejected obliquely because a nozzle in the thermal ink-jet head is partially clogged.

Ejection Stability Evaluation Criteria

A: The ejections were performed stably from start to finish under the all temperature atmospheres.

B: It cannot be said that the ejections were performed stably from start to finish, but practically sufficient ejections were performed.

C: Poor ejection and curved ejection occurred.

(d) Image Quality Evaluation

A document including characters and graphs was recorded on a plain paper (4200, manufactured by XEROX Corporation) with the combination of a treatment liquid and water-based inks of four colors, namely, yellow, magenta, cyan, and black using an ink-jet recording apparatus on which thermal ink-jet head is mounted. Then, an image quality (a degree of smudge of characters and chroma of a part that was color-recorded) of the document was evaluated according to the following criteria. A method for preparing water-based inks of four colors is as follows. That is, components in water-based ink composition (Table 1) except a dispersion aqueous solution of self-dispersing pigment were mixed uniformly, and thus an ink solvent was obtained. Then the ink solvent was added to the dispersion aqueous solution of self-dispersing pigment, and they were mixed uniformly. Thereafter a mixture thus obtained was filtered with an acetyl cellulose membrane filter (with a pore size of 3.00 μm) manufactured by Toyo Roshi Kaisha, Ltd. Thus, each of the water-based inks of four colors was obtained.

TABLE 1

|  |  | Black | Yellow | Magenta | Cyan |
|---|---|---|---|---|---|
| Ink composition (wt %) | CAB-O-JET® 300 (*1) | 20.0 (3.0) | — | — | — |
|  | CAB-O-JET® 270Y (*2) | — | 30.0 (3.0) | — | — |
|  | CAB-O-JET® 260M (*3) | — | — | 30.0 (3.0) | — |
|  | CAB-O-JET® 250C (*4) | — | — | — | 30.0 (3.0) |
|  | Glycerin | 7.0 | 7.0 | 7.0 | 7.0 |
|  | Diethylene glycol | 5.0 | 5.0 | 5.0 | 5.0 |
|  | Olfine® E1010 (*5) | 1.0 | 1.0 | 1.0 | 1.0 |
|  | Water | Balance | Balance | Balance | Balance |

(*1): Dispersion aqueous solution of self-dispersing carbon black (pigment), with a pigment concentration of 15 wt %, manufactured by Cabot Specialty Chemicals Inc., a number in parentheses represents a solid content of pigment.
(*2): Dispersion aqueous solution of self-dispersing yellow pigment, with a pigment concentration of 10 wt %, manufactured by Cabot Specialty Chemicals Inc., a number in parentheses represents a solid content of pigment.
(*3): Dispersion aqueous solution of self-dispersing magenta pigment, with a pigment concentration of 10 wt %, manufactured by Cabot Specialty Chemicals Inc., a number in parentheses represents a solid content of pigment.
(*4): Dispersion aqueous solution of self-dispersing cyan pigment, with a pigment concentration of 10 wt %, manufactured by Cabot Specialty Chemicals Inc., a number in parentheses represents a solid content of pigment.
(*5): Acetylene glycol surfactant (ethylene oxide (10 mol) adduct of diol), manufactured by Nissin Chemical Co., Ltd.

Image Quality Evaluation Criteria

A: a high image quality was obtained.

B: although a high image quality was not obtained, practically sufficient image quality was obtained.

C: There was a problem in any of smudge of characters, recording concentration, and chroma of a part that was color-recorded or in all of them.

The composition of the treatment liquids and measurement and evaluation results of the examples are shown in Table 2. The composition of the treatment liquids and measurement and evaluation results of the comparative examples are shown in Table 3.

TABLE 2

|  |  | Example 1 | Example 2 | Example 3 | Example 4 | Example 5 | Example 6 | Example 7 | Example 8 |
|---|---|---|---|---|---|---|---|---|---|
| Composition | Glycerin | 7.0 | 7.0 | 7.0 | 7.0 | 7.0 | 7.0 | 7.0 | 7.0 |
|  | Diethylene glycol | 5.0 | 5.0 | 5.0 | 5.0 | 5.0 | 5.0 | 5.0 | 5.0 |
|  | Olfine® E1010 (*1) | 1.0 | 1.0 | 1.0 | 1.0 | 1.0 | 1.0 | 1.0 | 1.0 |
|  | Calcium nitrate | 2.0 | 2.0 | 2.0 | 2.0 | 15.0 | 15.0 | 15.0 | 15.0 |
|  | Water | Balance (*2) | Balance (*2) | Balance (*2) | Balance (*2) | Balance | Balance (*2) | Balance (*2) | Balance (*2) |
|  | pH adjustment | Nitric acid aqueous solution | Nitric acid aqueous solution | Nitric acid aqueous solution | Acetic acid aqueous solution | — | Nitric acid aqueous solution | Nitric acid aqueous solution | Nitric acid aqueous solution |
|  | pH | 7.0 | 5.7 | 4.0 | 3.8 | 7.4 | 6.8 | 5.9 | 4.0 |
|  | Heat and deaeration treatments | None | None | None | None | Performed | None | None | None |
|  | Dissolved carbon dioxide concentration (mg/l) | 3.2 | 1.5 | 1.2 | 1.2 | 4.0 | 3.8 | 3.5 | 1.2 |

TABLE 2-continued

|  |  | Example 1 | Example 2 | Example 3 | Example 4 | Example 5 | Example 6 | Example 7 | Example 8 |
|---|---|---|---|---|---|---|---|---|---|
| Evaluation | Ejection stability | B | A | A | A | B | B | B | A |
|  | Image quality | B | B | B | B | A | A | A | A |

(*1) Acetylene glycol surfactant (ethylene oxide (10 mol) adduct of diol), manufactured by Nissin Chemical Co., Ltd.
(*2) The water contains nitric acid aqueous solution or acetic acid aqueous solution for pH adjustment.

TABLE 3

|  |  | Comp. Example 1 | Comp. Example 2 | Comp. Example 3 | Comp. Example 4 | Comp. Example 5 | Comp. Example 6 |
|---|---|---|---|---|---|---|---|
| Composition | Glycerin | 7.0 | 7.0 | 7.0 | 7.0 | 7.0 | 7.0 |
|  | Diethylene glycol | 5.0 | 5.0 | 5.0 | 5.0 | 5.0 | 5.0 |
|  | Olfine ® E1010 (*1) | 1.0 | 1.0 | 1.0 | 1.0 | 1.0 | 1.0 |
|  | Calcium nitrate | 2.0 | 2.0 | 15.0 | — | — | — |
|  | Water | Balance | Balance | Balance | Balance | Balance (*2) | Balance (*2) |
|  | pH adjustment | — | — | — | — | Nitric acid aqueous solution | Nitric acid aqueous solution |
|  | pH | 7.8 | 7.7 | 7.6 | 8.1 | 4.6 | 2.0 |
|  | Heat and deaeration treatments | None | Performed | None | None | None | None |
|  | Dissolved carbon dioxide concentration (mg/l) | 7.6 | 5.0 | 4.4 | 5.6 | 3.3 | 1.3 |
| Evaluation | Ejection stability | C | C | C | A | A | A |
|  | Image quality | B | B | A | C | C | C |

(*1) Acetylene glycol surfactant (ethylene oxide (10 mol) adduct of diol), manufactured by Nissin Chemical Co., Ltd.
(*2) The water contains nitric acid aqueous solution for pH adjustment.

As summarized in Table 2, Examples 1 to 8 were favorable in result of ejection stability evaluation and image quality evaluation. In contrast, as summarized in Table 3, Comparative Examples 1 to 3 in which although each of the treatment liquids contains a calcium ion because calcium nitrate is mixed in each of them, the each has a dissolved carbon dioxide concentration in excess of 4 mg/l and has pH in excess of 7.4 were unfavorable in result of ejection stability evaluation. Comparative Examples 4 to 6 in which each of the treatment liquids contains no calcium ion were unfavorable in result of image quality evaluation.

(1) Heat Test at 300° C.

Figure 2:
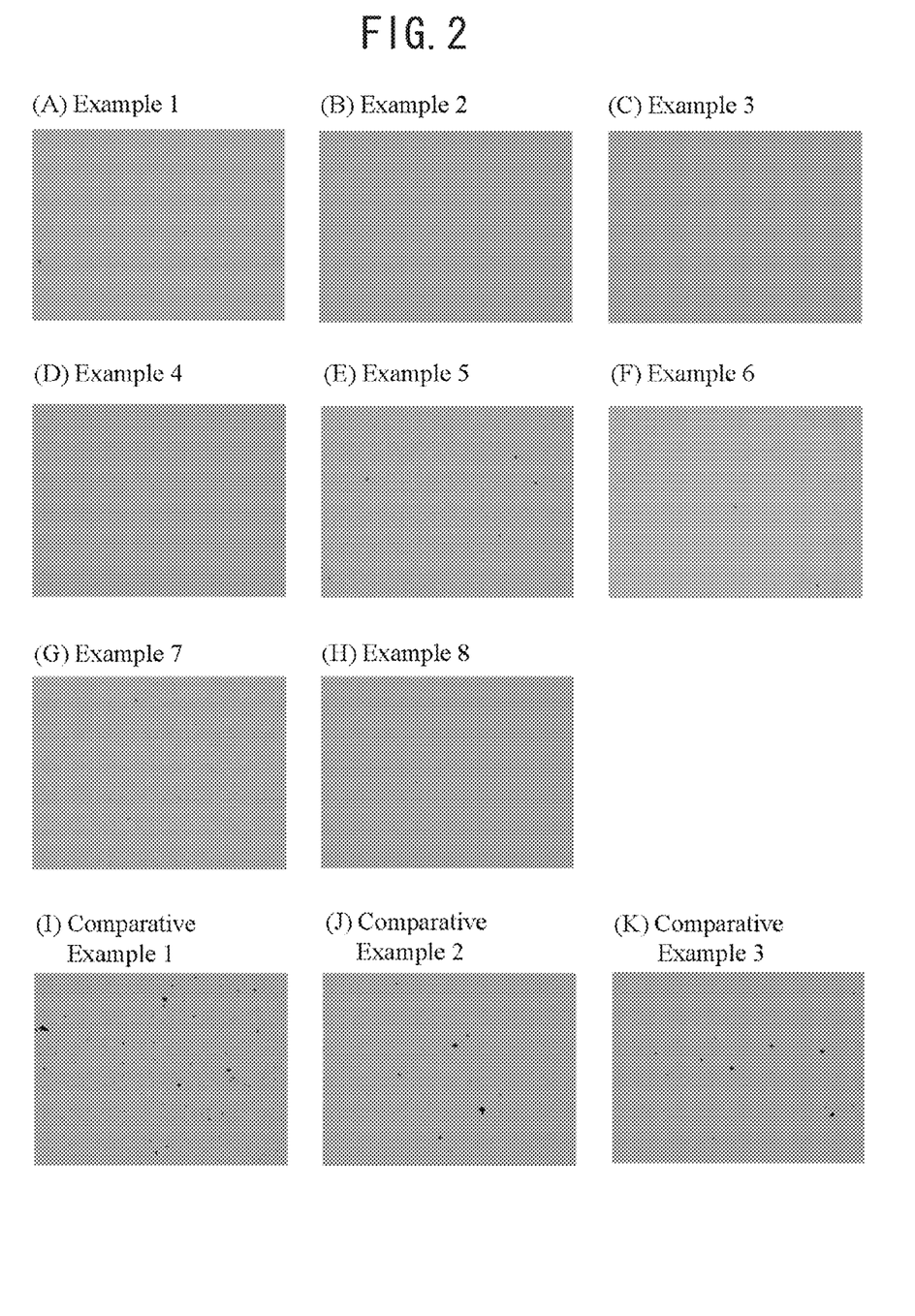
FIGS. 2A to 2K are microscope photographs showing the respective results of heat tests at 300° C. of the examples and the comparative examples.
Figure 3:
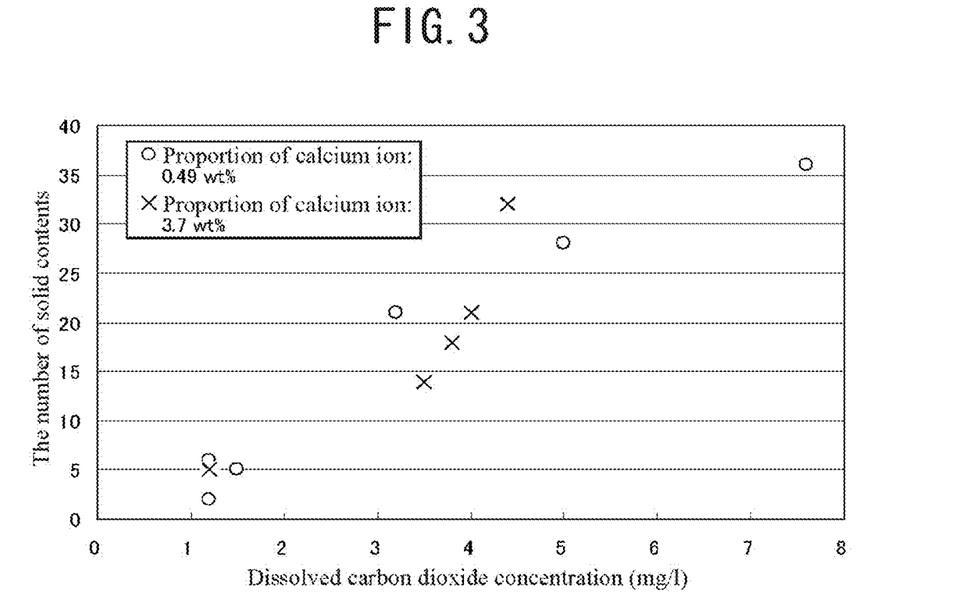
FIG. 3 is a graph showing a relationship between dissolved carbon dioxide concentration and the number of solid contents in the heat tests at 300° C. of the examples and the comparative examples.
Figure 4:
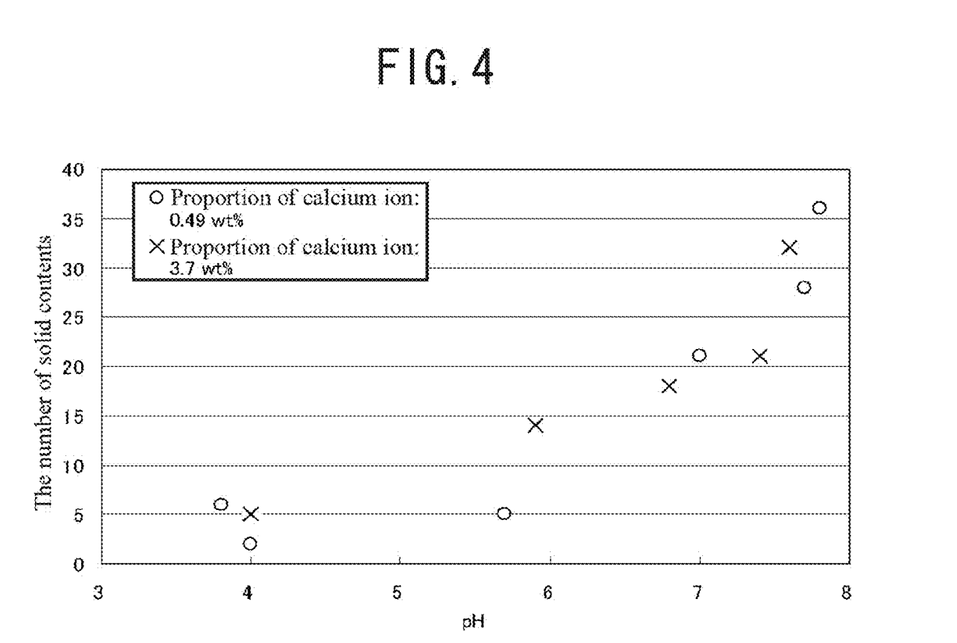
FIG. 4 is a graph showing a relationship between pH and the number of solid contents in the heat tests at 300° C. of the examples and the comparative examples.

With respect to each of Examples 1 to 8 and Comparative Examples 1 to 3, a heat test at 300° C. was performed by the following method. That is, a drop of treatment liquid was dropped on a slide glass, and then, a soldering iron (HAKKO926, manufactured by HAKKO CORPORATION) heated to 300° C. was brought into contact five times with the treatment liquid. Thereafter, the number of solid contents was measured by observing the slide glass in one field using a microscope at 50-fold magnification (5×10 fold). The results are shown in FIG. 2 and summarized in Table 4. A relationship between dissolved carbon dioxide concentration and the number of solid contents in the heat tests at 300° C. is shown in FIG. 3. A relationship between pH and the number of solid contents in the heat tests at 300° C. is shown in FIG. 4. FIGS. 2A to 2H are microscope photographs of Examples 1 to 8, respectively. FIGS. 2I to 2K are microscope photographs of Comparative Examples 1 to 3, respectively. In Table 4, the proportion of calcium ion in the treatment liquid is a concentration of calcium ion assuming that calcium nitrate is ionized 100% in a liquid for improving water-based image quality.

TABLE 4

|  | Proportion of calcium ion (wt %) | The number of solid contents | Dissolved carbon dioxide concentration (mg/l) | pH |
|---|---|---|---|---|
| Comp. Example 1 | 0.49 | 36 | 7.6 | 7.8 |
| Comp. Example 2 |  | 28 | 5.0 | 7.7 |
| Example 1 |  | 21 | 3.2 | 7.0 |
| Example 2 |  | 5 | 1.5 | 5.7 |
| Example 3 |  | 2 | 1.2 | 4.0 |
| Example 4 |  | 6 | 1.2 | 3.8 |
| Comp. Example 3 | 3.7 | 32 | 4.4 | 7.6 |
| Example 5 |  | 21 | 4.0 | 7.4 |
| Example 6 |  | 18 | 3.8 | 6.8 |
| Example 7 |  | 14 | 3.5 | 5.9 |
| Example 8 |  | 5 | 1.2 | 4.0 |

As shown in FIG. 2 and summarized in Table 4, generation of solid content was suppressed in the treatment liquids of Examples 1 to 8 as compared with those of Comparative Examples 1 to 3. Thus, it can be assumed that there is no risk to cause nozzle clogging even when the treatment liquids of Examples 1 to 8 were heated by using them in a thermal ink-jet head. Further, as shown in FIGS. 3 and 4, it was found out that there is a tendency that in the case of treatment liquids having the identical proportion of calcium ion to each other, the lower the dissolved carbon dioxide concentration and pH, the fewer the number of solid contents to be generated.

(2) Image Evaluation Test

With respect to each of Examples 3 and 8 and Comparative Example 5, an image evaluation test was performed by the following method. That is, a treatment liquid is ejected on a plain paper (4200, manufactured by XEROX Corporation) using a digital multi-function center DCP-330C on which an ink-jet printer is mounted, manufactured by Brother Industries, Ltd. at a resolution of 600 dpi. Thereafter, each of the water-based inks of four colors was struck over at a resolution of 600 dpi and a coverage factor of 100% duty. Thus, the respective single patches of four colors were obtained. Then, an optical density (OD) of the water-based ink of black was measured by a spectrocolorimeter, SpectroEye, manufactured by X-Rite Incorporated. Further, with respect to each of the water-based inks of three colors other than black, chroma (C*) was measured by the spectrocolorimeter. These were compared with those of blank under the same condition except that an ejection of treatment liquid was not performed. These results are summarized in Table 5.

TABLE 5

|  |  | Example 3 | Example 8 | Comp. Example 5 | Blank |
|---|---|---|---|---|---|
| Black | Optical density (OD) | 1.11 | 1.17 | 0.97 | 1.01 |
| Yellow | Chroma (C*) | 70.7 | 71.4 | 70.0 | 69.9 |
| Magenta | Chroma (C*) | 54.1 | 56.0 | 51.8 | 51.3 |
| Cyan | Chroma (C*) | 49.0 | 49.6 | 48.0 | 47.8 |

As summarized in Table 5, an optical density (OD) of the water-based ink of black of Comparative Example 5 in which the treatment liquid contains no calcium ion was about the same as that of blank. On the other hand, the optical densities (OD) of the water-based inks of black of Examples 3 and 8 in which each of the treatment liquids contains a calcium ion because calcium nitrate is mixed in each of them were high as compared with that of blank. Further, chroma (C*) of single patches obtained by performing recording with the water-based inks of three colors of Comparative Example 5 also was about the same as that of blank. Chroma (C*) of single patches obtained by performing recording with the water-based inks of three colors of Examples 3 and 8 was high as compared with that of blank.

It will be obvious to those having skill in the art that many changes may be made in the above-described details of the particular aspects described herein without departing from the spirit or scope of the invention as defined in the appended claims.

What is claimed is:

1. A treatment liquid for ink jet recording, comprising:
   a polyvalent metal ion; and
   water, wherein
   a dissolved carbon dioxide concentration in the treatment liquid is 4 mg/l or lower.

2. The treatment liquid according to claim 1, wherein a pH of the treatment liquid is 7.4 or lower.

3. The treatment liquid according to claim 1, wherein the polyvalent metal ion is a calcium ion.

4. The treatment liquid according to claim 1, wherein
   an amount of the polyvalent metal ion to be added with respect to a total amount of the treatment liquid is in a range of 0.3 wt % to 10 wt %.

5. The treatment liquid according to claim 3, wherein
   the calcium ion is added as a salt composed of the calcium ion and an anion binding to the calcium ion or an aqueous solution thereof, and
   the anion is a nitrate ion.

6. The treatment liquid according to claim 1, wherein the dissolved carbon dioxide concentration in the treatment liquid is in a range of 1.2 mg/l to 4 mg/l.

7. The treatment liquid according to claim 1, wherein a pH of the treatment liquid is in a range of 3.5 to 6.8

8. The treatment liquid according to claim 1, wherein a pH of the treatment liquid is in a range of 3.8 to 5.7.

9. A method for producing a treatment liquid comprising a polyvalent metal ion and water, the method comprising:
   a step of adjusting a dissolved carbon dioxide concentration in the treatment liquid to 4 mg/l or lower by performing at least one of a heat treatment and a deaeration treatment.

10. The treatment liquid producing method according claim 9, wherein
    a time of the heat treatment is in a range of 10 minutes to 60 minutes.

11. The treatment liquid producing method according claim 9, wherein
    the deaeration treatment is a treatment wherein the treatment liquid is stood still at a negative pressure in the range of −0.07 MPa to −0.1 MPa for a time in a range of 1 hour to 30 hours.

12. A water-based ink set for ink jet recording, comprising:
    a water-based ink for ink jet recording; and
    a treatment liquid, wherein
    the water-based ink comprises: a coloring agent; water; and a water-soluble organic solvent, and
    the treatment liquid is the treatment liquid according to claim 1.

13. An ink-jet recording method for performing recording using a water-based ink set for ink jet recording with a thermal ink-jet technique, the water-based ink comprising a water-based ink for ink jet recording and a treatment liquid, the method comprising:
    a step of ejecting the treatment liquid and the water-based ink on a recording medium with a thermal ink jet technique, wherein
    as the water-based ink set, the water-based ink set for ink jet recording according to claim 12 is used.

14. An ink-jet recording apparatus, comprising:
    an ink set storing portion; and
    an ink-jet head of a thermal ink-jet technique, wherein
    the water-based ink set for ink jet recording according to claim 12 is stored in the ink set storing portion,
    a treatment liquid and a water-based ink that compose the water-based ink set are ejected on a recording medium from the ink-jet head.

15. A method for preventing nozzle clogging caused by a treatment liquid in a thermal ink jet technique, wherein
    as the treatment liquid, a treatment liquid comprising a polyvalent metal ion and water is used, and
    a dissolved carbon dioxide concentration in the treatment liquid is adjusted to 4 mg/l or lower.

* * * * *